Oct. 8, 1929.  B. DE MATTIA  1,730,760
COLLAPSIBLE CORE
Original Filed Oct. 22, 1923    5 Sheets-Sheet 1

WITNESSES

INVENTOR
BARTHOLD DE MATTIA
BY
ATTORNEYS

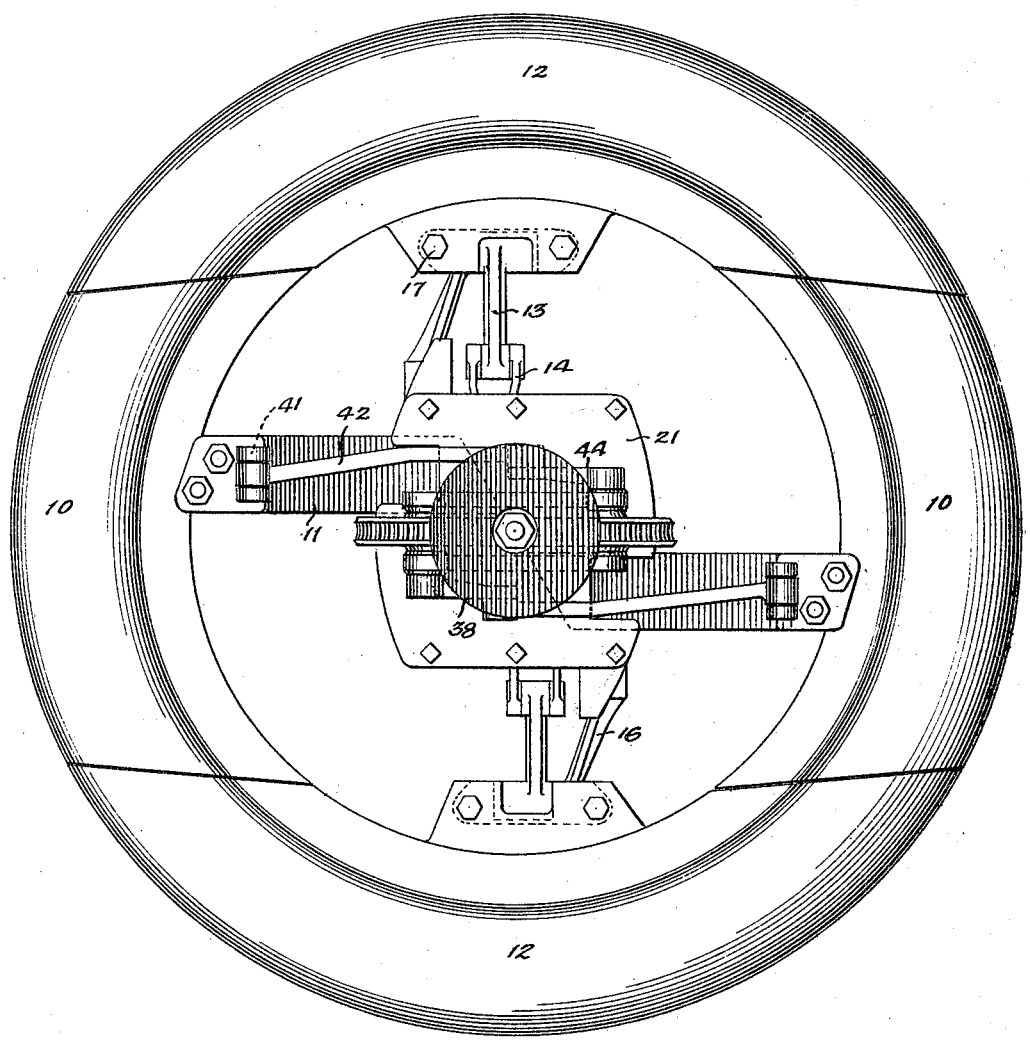

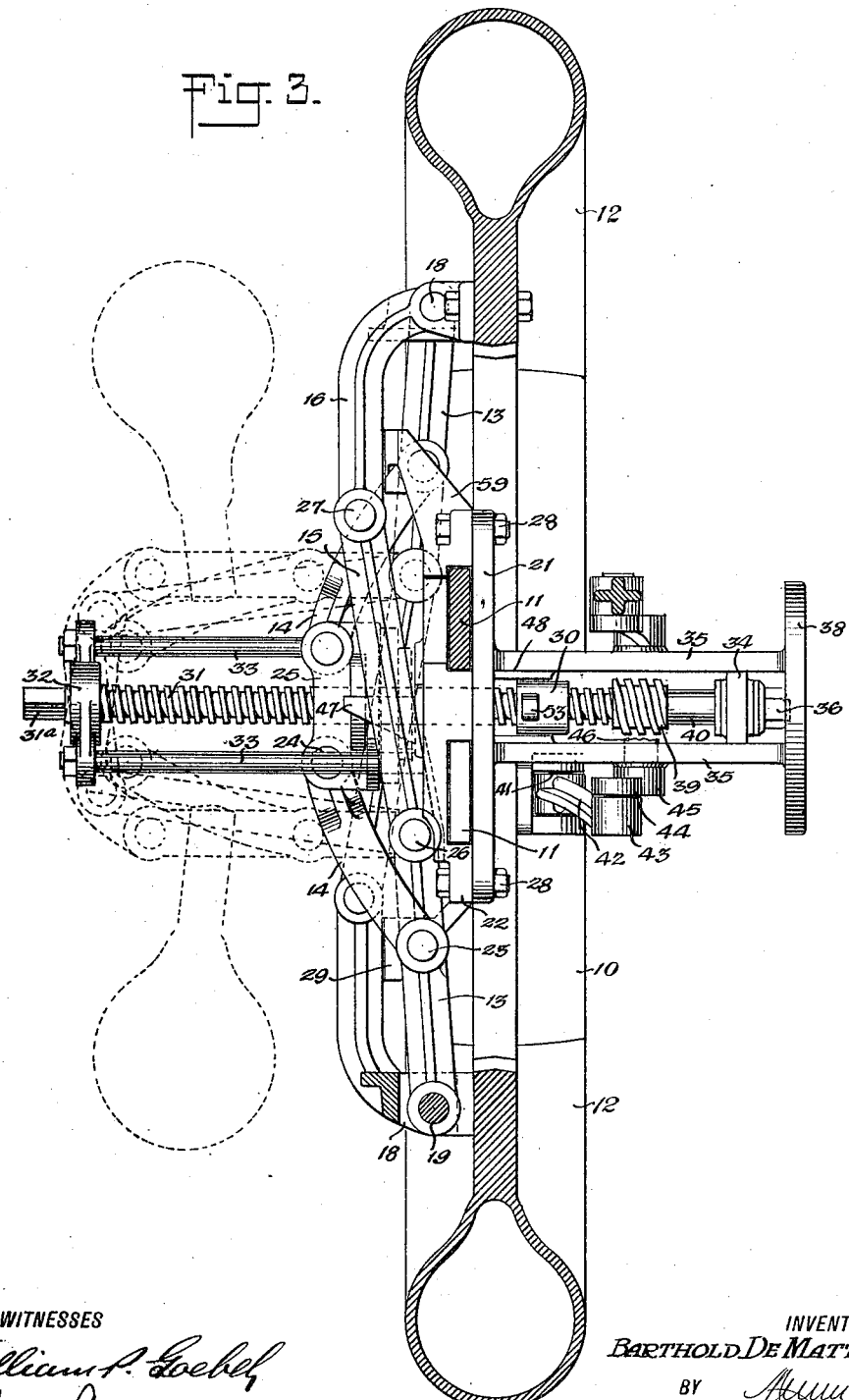

Oct. 8, 1929. B. DE MATTIA 1,730,760
COLLAPSIBLE CORE
Original Filed Oct. 22, 1923   5 Sheets-Sheet 4
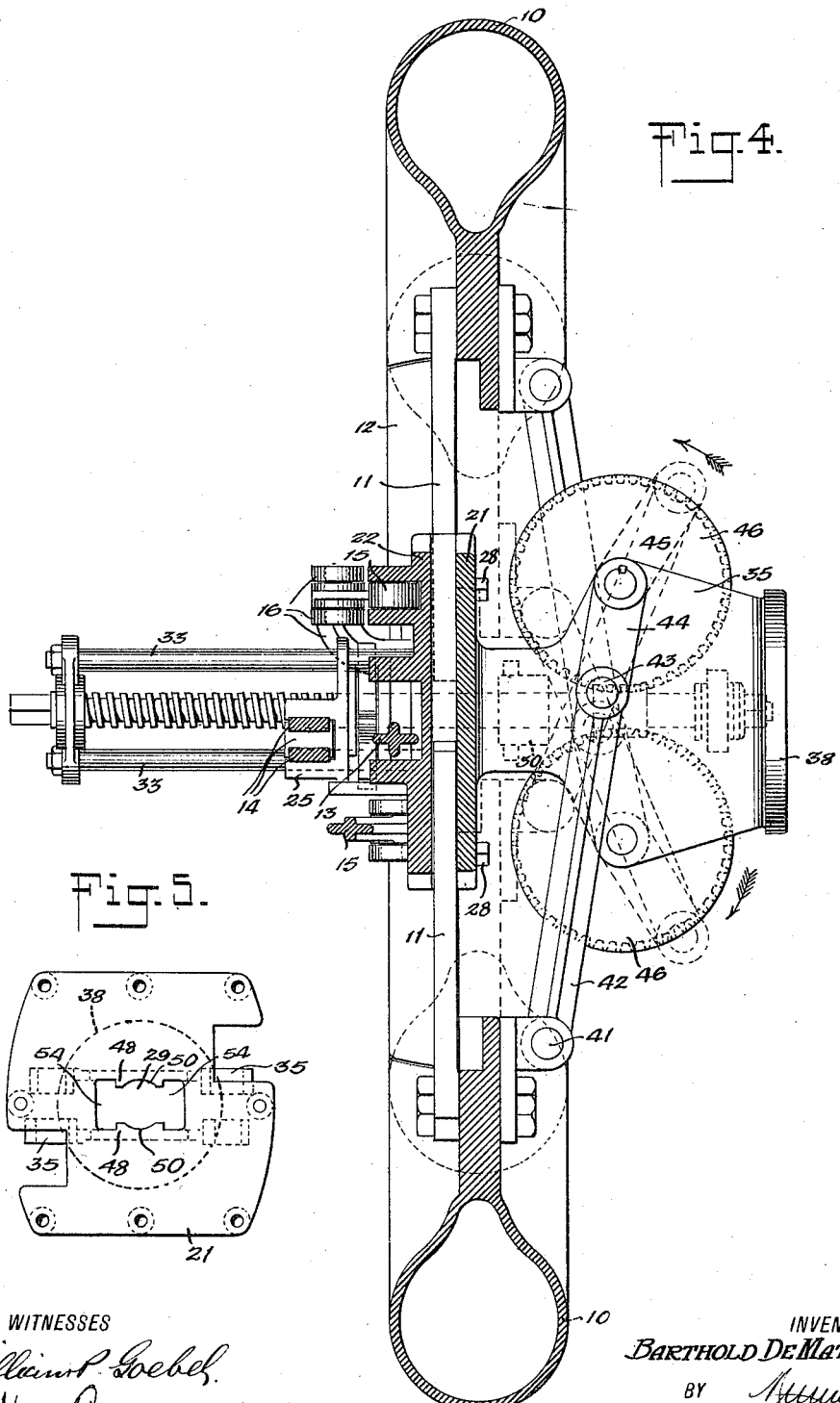
WITNESSES
INVENTOR
BARTHOLD DE MATTIA
BY
ATTORNEYS Oct. 8, 1929. B. DE MATTIA 1,730,760
COLLAPSIBLE CORE
Original Filed Oct. 22, 1923  5 Sheets-Sheet 5
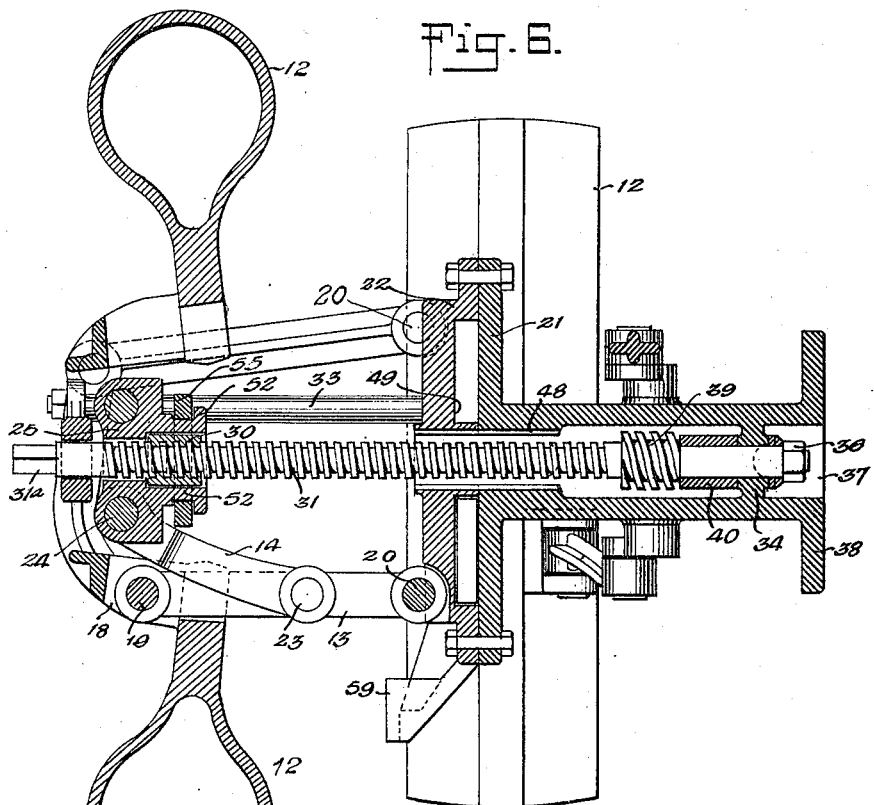
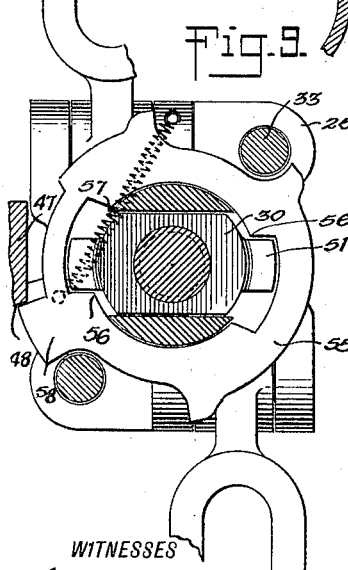
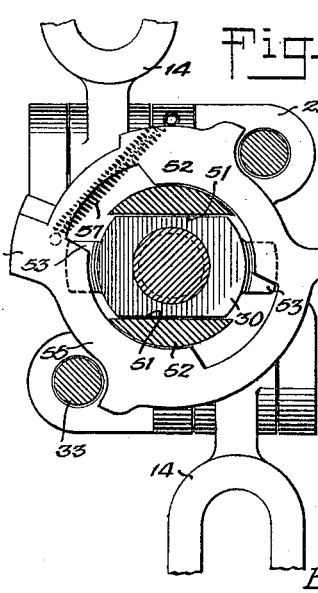
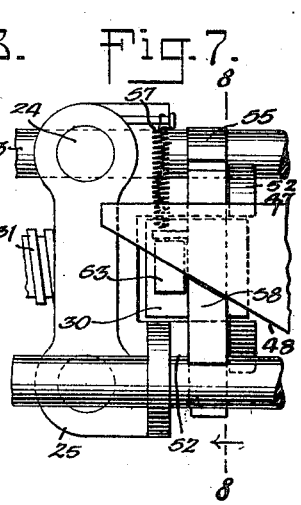
WITNESSES
INVENTOR
BARTHOLD DE MATTIA
BY
ATTORNEYS Patented Oct. 8, 1929

1,730,760

UNITED STATES PATENT OFFICE

BARTHOLD DE MATTIA, OF GARFIELD, NEW JERSEY, ASSIGNOR, BY MESNE ASSIGNMENTS, TO NATIONAL RUBBER MACHINERY COMPANY, OF AKRON, OHIO, A CORPORATION OF OHIO

COLLAPSIBLE CORE

Application filed October 22, 1923, Serial No. 670,187. Renewed August 21, 1929.

This invention relates to collapsible cores used in the manufacture of automobile tire shoes or the like.

The prime object of the invention is to provide a collapsible core, and mounting and operating devices for the core sections such that after the core is employed for the building up of a tire thereon, the sections may be so disposed, quickly and easily, to permit ready stripping of the tire from the core, and then, with equal quickness and ease may be restored to their normal assembly, for the building up of another tire thereon; and such a core, wherein only four sections may constitute the entire core and yet only two of the sections are moved otherwise than in the plane of normal assembly of the sections, heretofore generally defined in the art as the plane of operative continuity.

To the end just stated, the collapsible core of the present invention essentially includes four segmental or arcuate sections, arranged in pairs, of which the members of the pairs are normally arranged in alternation in the plane of operative continuity, or, as it may also be expressed, in the same plane with their arcs in the same circle in that plane; whether said plane be vertical, horizontal or otherwise disposed. Of these two pairs of sections, one pair, hereinafter called the key-sections, are slidable radially toward and away from each other in said plane, and the other pair, hereinafter called the secondary sections, are swingable into and out of said plane, toward and away from each other, preferably by a compound movement partaking of the qualities of a translational movement as well as a pivotal movement; and, in order automatically to synchronize the translational and pivotal motions of the secondary sections, there are provided for the latter, preferably, substantially duplicate link and lever systems each appropriate to its own secondary section and both systems operatively inter-connected. Each of these link and lever systems are designed to function in a manner somewhat analogous to the characteristic operation of a familiar parallelogram of levers, the pivoted and interpivoted element of each system coacting not only to swing the secondary sections bodily out of their appointed positions in the plane of operative continuity but to rotate said sections incident to such swinging. According to this construction, the secondary sections always leave the plane of operative continuity and return thereto with their arcs properly disposed in said plane, and also, the secondary sections have their arcs disposed substantially parallel to said plane when the sections are swung wholly out of the plane and at the same time advanced toward each other fully to contract the core.

Also, according to the invention as thus preferably embodied, and with the incidental objects in mind of increasing the simplicity and ease of operation of the core, reducing the amplitudes of movement of the secondary sections transversely of the plane of operative continuity of the core, and increasing the compactness and ruggedness of the mounting and operating devices of the sections, preferably automatic means of the lost-motion type are provided whereby the secondary or swinging sections are not disturbed relative to said plane until the key sections, merely slidable in said plane as aforesaid, are given predetermined sliding movements toward each other in first contracting the core for the purpose of facilitating swinging movements of the secondary sections out of said plane.

A further object of the invention is to provide a single main actuator or controller for operation in one direction to actuate first the key sections and next the secondary sections as just described, and for operation in the reverse direction to restore all the sections to normal assembly in the plane of operative continuity by giving predetermined sliding movements of the key sections toward and away from each other as the secondary or swinging sections are being restored to the plane of operative continuity.

To these ends, preferably, said actuator is a feed-screw mounted for rotation but held against endwise movement, and having its axis prependicular to and central with the circle defined by the arcs of all the sections when in the plane of operative continuity; said screw carrying at one side of said plane a worm meshing with a pair of worm gears carrying crank arms linked to parallel slides on each of which one of the key sections is secured; while from the other side of said plane extend cross-head guides parallel to said worm and for mounting a cross-head on which are pivoted certain of the link elements for the secondary or swinging sections, but with such cross-head always so positioned longitudinally of its guides that a nut traveller on the screw has a certain idle travel along the screw relative to the cross-head during each operation of the screw to change the core from fully expanded to fully contracted condition and vice versa. According to such a construction, the nut constitutes the lost-motion means aforesaid relative to the initiation of operation of the cross-head to impart a combined translational and swinging movement to the secondary sections as a step to be initiated in predetermined relation to sliding movements of the key sections in contracting the core. In the same way, upon reversing the direction of rotation of the screw to expand the core, the nut is effective, by means of an automatically operated latch means, the provision of such means of a simple and reliable type being one of the objects of the invention, first to seize the cross-head to retract the latter toward the plane of the sliding sections and secondly to swing the secondary sections back toward and into said plane, simultaneously with the rotations of the worm gears to slide each of the key sections through the first portion of its outward sliding movement in the plane of operative continuity; the nut being freed by such latch means concurrently with the completion of said expanding movements of the sliding key sections, to permit the nut to travel idly along the screw for a disposition beyond the halted cross-head and hence in readiness for acting as a lost-motion means as aforesaid, between the screw of the cross-head and relative to the secondary or swinging sections, in subsequently expanding the core.

The invention will be more clearly understood from the following description, when taken in connection with the accompanying drawings showing an embodiment of the invention as at present preferred.

In said drawings, in which the plane of operative continuity of the core is assumed to be vertical, Fig. 1 shows the core in front elevation;

Fig. 2 is a view of the same core in rear elevation;

Fig. 3 is approximately a vertical section, taken on line 3—3 of Fig. 1, and showing in broken lines the positions assumed by the secondary sections and certain other parts when the core is collapsed;

Fig. 4 is a horizontal section, taken on line 4—4 of Fig. 1, and showing in broken lines the positions assumed by the key sections and certain other parts when the core is collapsed;

Fig. 5 shows, detached, and in front elevation, that is, when viewed from the left in Fig. 4, the rear or worm-wheel-mounting casting shown in side elevation in said Fig. 4;

Fig. 6 is a fragmentary view, being a section taken on line 6—6 of Fig. 1, with the key sections and all their operating parts shown in full lines in the positions assumed when the core is completely collapsed;

Fig. 7 is an enlarged fragmentary view, showing certain of the parts of Fig. 2, and more particularly illustrating the automatic latching and unlatching means for the nut traveller and cross-head;

Fig. 8 is a section taken on line 8—8 of Fig. 7, and showing such latching means locked; and Fig. 9 is a view similar to Fig. 8, but showing said latching means unlocked.

Similar reference characters refer to similar parts throughout the several views of the drawings.

Figure 1:
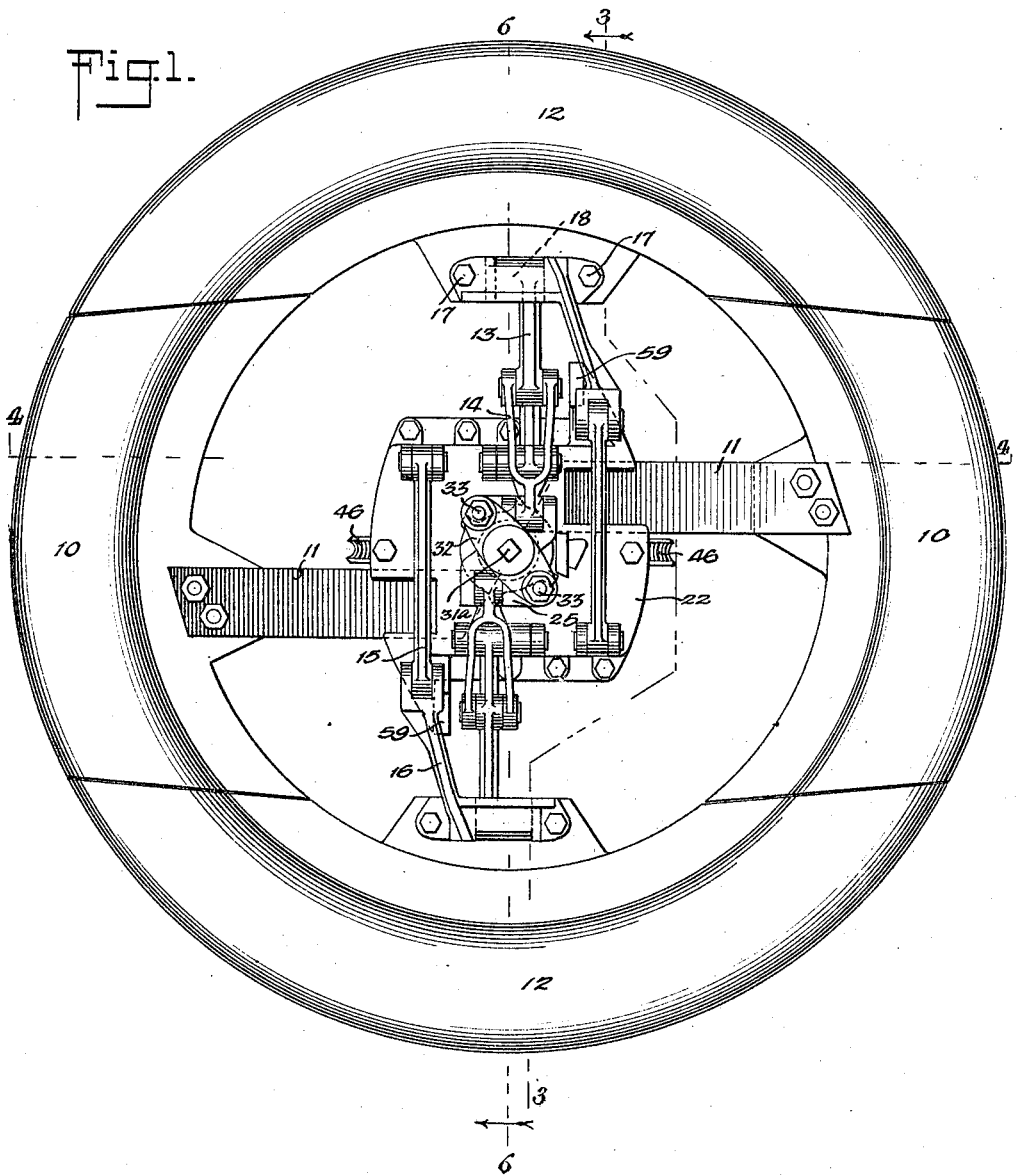

As shown best in Figs. 1 and 2, the key sections 10 are secured rigidly at the outer ends of upper and lower slides 11; while each of the secondary sections 12 is floatingly or multi-pivotally supported by a pair of linkages one including a hinged link 13 and a hinge-thrusting lever 14 and the other including a justifying or section-tilting link 15 and an arm 16 bolted at 17 to its appropriate secondary section.

As best seen from a comparison of Figs. 1 and 2 with Figs. 3 and 6, each arm 16 is hollowed out at its end carrying bolts 17, and between such bolts as indicated at 18 in Figs. 3 and 6, to provide a socket spanned by a pin 19 for pivotally mounting the adjacent end of the associated link 13, the opposite end of which link is pivoted, as indicated at 20 in Fig. 6, to the casting 22 which, with another casting 21, forms the fixed hub structure of the entire apparatus. Still referring primarily to Figs. 3 and 6, for the locations of the reference numerals now to be used, each lever 14 is pivoted at one end, at 23, to and intermediate the ends of its associated link 13, and said lever 14 is pivoted at its other end, at 24, to a cross-head 25. Now comparing Figs. 1 and 3, each link 15 is pivoted at one end, at 26, to casting 22, and at its other end, at 27, to arm 16.

A comparison of Figs. 3 and 4 will better illustrate the manner of assemblage of the parts just described, and will also show plainly the manner in which castings 21 and 22, forming the hub-structure aforesaid, by being located together as indicated at 28, are formed on their meeting faces to provide ways for the slides 11 for the key sections; casting 21 presenting a plane face relative to the other casting, that is, the face seen in Fig. 5. These castings are provided with registering transverse openings, one of which is shown at 29 in Fig. 5, for permitting back and forth movement through the castings of a traveller block or nut 30 (stopping for a moment to compare Figs. 3 and 6, and also Figs. 7, 8 and 9). This nut is actuated to travel between its two limits of movement shown respectively in Figs. 3 and 6, on rotating feed screw 31 by means of a suitable tool (not shown) applied to a polygonal end 31ᵃ of the feed-screw projecting beyond an elliptical outer bearing-block 32 for the screw. Block 32 is supported rigidly on the outer ends of a pair of diagonally-placed cross-head guide-rods 33 suitably anchored at their inner ends to casting 21. The opposite end of the feed-screw is journalled in a bridge-web, marked 34 in Figs. 3 and 6, between spaced parallel perpendicularly offset plate-webs 35 carried integrally by casting 21. The feed-screw is held against endwise movement by a worm 39 and a sleeve-like collar 40, on the screw between the hub-structure and the bridge-web 34, and by a clamp nut threaded on the screw as indicated at 36 and located beyond said bridge-web in a pocket 37 formed at the center of a disk-terminus 38 common to both plate-webs of casting 21; whereby, in a suitable manner not shown, the entire hub-structure and consequently the entire collapsible core and its operating devices may be secured to a substantially horizontal jack-arm or the like (not shown) forming a part of any approved foundation structure for the core.

As best shown in Figs. 2 and 4, with occasional references to Figs. 3 and 6, each slide 11 for one of the two key sections 10, has pivotally attached thereto, as at 41, one end of a link 42 the free end of which is pivoted at 43 to a crank arm 44 keyed on a stud shaft 45 journalled in plate-webs 35 and fixedly carrying between the webs a worm gear 46 meshing with worm 39 on feed-screw 31 as aforesaid, which worm is fixed on the feed screw. The two worm wheels directly mesh with the worm on opposite sides of the latter, so that on rotation of the worm the crank arms are swung in opposite directions and the slides 11 are similarly shifted, that is, to move the key sections 10 in or out.

Comparing now Figs. 3 and 7, it will be seen that casting 22 carries integrally a shaped projection 47, having, as best seen from a comparison of Figs. 7 and 9, a ramp portion presenting a surface 48 inclined along its length and also laterally; the purpose of which device, really a fixed cam, will be understood in a moment. As will be seen from a reference to Fig. 6, castings 21 and 22 are provided with diametrically opposite and aligning ribs 48 and 49 within the clear-way transverse openings provided in said castings for screw 31. The transverse shape of each such clearway opening is, as aforesaid, that indicated at 29 in Fig. 5 in the case of the casting 21; from which Fig. 5 it will also be seen that each rather wide rib along the median longitudinal portion of its inner face is cut away as indicated at 50 to establish a clear-way space between the ribs to provide in effect a cylindrical gate or port by way of which the feed-screw 31 and its fixed worm 39 may be endwisely applied for incorporation in the apparatus in first building up the latter. Still referring to Fig. 5, the laterally spaced plane-topped minor ribs thus provided by each line of ribs 48—49, with the nut 30 disposed as shown in Figs. 3 and 4, act as keys relative to said nut, due to the provision of opposite plane parallel sides for the nut marked 51 in Fig. 8, during each travel of the nut all along the aligned ribs 48 and 49, as toward the position of Fig. 3 or toward entry between the bifurcated inner ends, marked 52 in Figs. 6 and 8, of cross-head 25. Next pausing to compare Figs. 3 and 8, it will be noted that nut 30 carries on opposite sides outwardly projecting lugs 53, which lugs, when the nut is within the limits of casting 21 or 22, are accommodated in the portions, marked 54 in Fig 5, of the aligned transverse openings through the two castings, and on opposite sides of ribs 48 and 49. Now, with the parts all arranged as shown in Fig. 3, of which parts the nut 30 is properly shown at its extreme limit of movement toward worm 39, it will be obvious that the keying means just described, on rotating screw 31 in the proper direction, will force the nut 30 to travel to the right in Fig. 3 until the right end of the nut passes beyond the left end of the ribs 49 in Fig. 6. Even then, however, the nut is not freed from keying restraint relative to the feed-screw; because always during a complete axial travel of the nut as above, the cross-head 25 will lie as shown in Figs. 3 and 7 and present its bifurcated inner end 52 in position to receive the offset plane parallel sides of the nut marked 51 in said Fig. 8 as aforesaid. As will be understood in a moment, the cross-head will always be fixedly disposed as described, during every travel of the nut from the location shown in Fig. 3 to that indicated in Fig. 7.

As to the latching means aforesaid: Circumferentially of its bifurcated end 51, cross-head 25 is provided with a groove which takes loosely, as clearly shown in Figs. 6 to 9, a flat frame-like rotary member 55. This member 55 constitutes, with certain associated parts including ramped projection 47, a means for predeterminedly latching together and releasing nut 30 and the cross-head; of which latching means the nut-lugs 53 may be said to be bolts for co-action with keeper-lips 56 presented by member 55 in the plane of its flat. The dimensions of the parts are such that once the nut fully enters within the bifurcated end 51 of cross-head 25, that is, once the nut-lugs 53 become disposed as in Fig. 8 relative to rotary member 55, further rotation of the feed-screw in a direction to continue movements of the key-sections 10 and to start movements of the secondary sections 12 out of their positions of operative continuity, not only brings about the last-mentioned operation, due to a thrusting action of the nut against the cross-head as the nut travels along the feed-screw toward the squared outer end of the screw, but insures that on subsequently reversing the direction of rotation of said screw the cross-head will be retracted toward the plane of operative continuity as the result of a pull on rotary member 55 by the lugs 53 of the nut now travelling toward such plane. In order to insure that said member 55 will be automatically fractionally rotated relative to cross-head 25 in one direction or the other as required, thus in turn to insure that said member will be disposed as shown in Fig. 9 at the instant the nut passes from within the clearway openings in the castings 21 and 22 to advance within the bifurcated end of cross-head 25, and to insure that during the early part of the immediately ensuing joint movement of the nut and cross-head further away from said castings the member 55 will be rotated to the position shown in Fig. 8, and to insure that during the remaining joint movement of the nut and cross-head toward the positions of Fig. 6 and the subsequent movement of such parts back to the locations shown in Fig. 7 the member 55 will maintain the position last referred to, and to insure that at the instant said parts reach the last-mentioned positions the member 55 will be restored to the position of Fig. 9,—said member is normally held to the position shown in Fig. 8 by a retractile coil spring 57 and carries a wiper lug 58 arranged to co-act with ramped projection 48 in moving said member against the spring.

In Figs. 1, 3 and 6 the diagonally disposed and inclined rests carried integrally by casting 22 and marked 59, are shaped so that each such rest provides a rather precise stop for one of the pivotally mounted members of one of the linkages for each secondary section 12, to wit, for the arm 16, and hence for the whole duplex link and lever system of each such section; which arrangement, combined with the feed-screw common to the operating mechanisms for all the sections, presents a perfect limiting and holding means for maintaining all the core sections in operative continuity when redisposed to that condition after collapsing of the core, and thus obviates the necessity for any other locking means for holding the sections when thus redisposed.

Operation

With the parts arranged as shown in Fig. 3, the special tool provided is applied to the squared end 31ª of the screw 31, and by means of such tool said screw and its fixed worm 39 are rotated in the proper direction to rotate the worm wheels 46 of Fig. 4 in the directions indicated by the arrows there shown, thus initiating a downward sliding movement of the upper slide 11 of Fig. 4 and a simultaneous upward sliding movement of the lower slide 11 of said Fig. 4 to move the key sections 10 in toward the axis of the feed-screw while maintaining the arcs of said sections in the plane of operative continuity. Meanwhile, the nut 30 is moved along the feed-screw and to the left in Fig. 4. At about the time said sections have almost reached the broken-line dispositions of Fig. 4, the nut 30 passes from between castings 21 and 22 and into cross-head 25 to become disposed therein and relative to latch member 55 as indicated in Figs. 7 and 9. The nut continues to travel axially of the feed-screw and toward the square end of the latter, but from now on the cross-head similarly travels with the nut, being pushed ahead of the same. Such travel of the cross-head acts to throw the linkages for the secondary sections (and the secondary sections also) toward the broken-line positions of Fig. 3; and while the nut and screw-head are thus travelling together toward the left in Fig. 3, worm wheels 46 further continue their rotations in the directions of the arrows of Fig. 4 to give the key sections 10 outward movements finally to dispose these sections about as shown in full lines in said Fig. 4. The linkages just mentioned are so designed that the secondary sections 12 are swung out of the plane of operative continuity without interference with the simultaneously but differentially moving key sections 10 following the pick-up of the cross-head by the nut for movement of the cross-head to the left in Fig. 4 as above. Simultaneously with such pick-up, that is, when the wiper-lug 58 has ridden free of the ramped surface 47 of projection 48 of Fig. 7 by moving with the cross-head beyond the outer end of the projection, spring 57, under constant tension, functions to rotate member 55 from the position of Fig. 8 to that of Fig. 9 to dispose the keeper-lips 56 of said member overlappingly of the rear faces of the bolt-lugs 53 of the nut; which relative dispositions of these parts is that existing when they reach the positions of Fig. 6 and the core is fully collapsed. At that time, the secondary sections 12 and the tire are wholly withdrawn from the plane of the key sections 10, and the tire is easily stripped from sections 12 of the collapsed core by way of the left-hand side of the apparatus as viewed in Fig. 4.

To restore the secondary sections to the plane of operative continuity and to restore all the sections to operative continuity, it is merely necessary, as before, to rotate the feed-screw 31, but now in the opposite direction.

Thereupon, while the worm wheels 46 are rotated by the fixed worm 39 on the screw, but in directions opposite to those indicated by the arrows of Fig. 4, with the result that key sections 10 are given inward and then outward sliding movements in said plane, the cross-head 25 travels along the guides 33 toward the plane of the sections 10, said cross-head being thus pulled along the guides by nut 30 coupled to the cross-head by the latch means including the rotatable or latching member 55 on the cross-head. During this movement of the cross-head along the guides 33, the secondary sections 12 are being given as above a series of translational and pivotal movements, with the result that when the cross-head and nut reach the positions shown in Fig. 7, the secondary sections are finally positioned as shown in full lines in Figs. 1 and 2 in the plane of operative continuity. As the cross-head, nut and secondary sections reach the locations last-mentioned, the ramp of projection 48 has just finished co-acting with wiper-lug 58 of rotary member 55 to dispose the parts as shown in Fig. 9 and hold such parts thus disposed, thereby releasing the nut from the cross-head for further and idle travel of the former, toward and to the position shown in Fig. 3, on further rotation of the feed-screw in the same direction sufficient to dispose the key sections 10 finally in expanded condition. The last-mentioned travel of the nut is an idle one because the instant the parts of Fig. 8 were re-disposed as shown in Figs. 9 and 7, as above, the nut was afforded free egress from within cross-head 25, and therefore the nut was permitted to pass through and beyond central castings 21 and 22, but away from the cross-head, which cross-head was halted at the position shown in Figs. 7 and 3 by the rests or stops 59 co-acting with the arms 16 of the secondary sections as best shown in Figs. 3 and 1.

It will thus be seen that while a section 10 is moved, a section 12 is also moved, these sections thus moving simultaneously, and yet the sections have differential movements in that one is sliding in the plane of operative continuity and the other is moving into and out of said plane. Otherwise stated, at least two of the sections have simultaneous differential movements relative to the position of operative continuity of all the sections. Such differential simultaneous movements of these sections are made possible by a preliminary sliding movement of the sections 10, before the sections 12 are moved, in collapsing the core, and a final sliding movement of the sections 10, after the sections 12 have finished moving, in restoring the core to operative continuity. These preliminary and final sliding movements of sections 10 are insured by the arrangement whereby the nut 30 travels along the screw 31 for some distance in either direction relative to the cross-head 25, whereby in turn said nut at predetermined intervals has idle movements so far as causing movements of the cross-head is concerned. In other words, the features of construction responsible for such idle movements of the nut, may be described as a lost motion means. It will also be seen, the axis of the screw 31 being perpendicular to the plane of operative continuity, that said screw may be described as a member rotatable about an axis perpendicular to said plane; while, consequently, either the cross-head 25 or the nut 30 may be described as a member which moves perpendicularly to said plane.

The travel nut 30 may be regarded as a register capable of travelling back and forth along the screw 31 to assume various settings simultaneously with the movement of the key sections 10, the particular setting of the register (nut 30) depending upon the amount of movement into or out of operative continuity of the key sections, the movement of the secondary sections being initiated by said register when it attains a certain desired setting. The advantage of this structural arrangement is evident for as a result thereof it is possible for the operator to collapse the core on the one hand by the use of a single continuous force applied in one direction only, and to build up the core or return the sections thereof to the position of operative continuity in the plane of operative continuity by the use of a single continuous force applied in the reverse direction.

I claim:

1. A collapsible core comprising a plurality of pairs of sections movable into and out of operative continuity, a pair of the sections being movable into and out of the plane of operative continuity and the other pair of sections being movable in the plane of operative continuity toward each other, operative connections being provided between the sections of each pair and between a section of one pair and a section of the other pair whereby movement of any one section is simultaneously accompanied by movements of the other three sections.

2. A collapsible core comprising a plurality of sections, means for swinging one of the sections out of the plane of operative continuity, means for sliding another section in said plane, and an operative connection between the swinging and sliding means for automatically insuring the movement of the sections in their proper sequence.

3. A collapsible core comprising a plurality of sections, means for swinging one of the sections out of the plane of operative continuity, means for sliding another section in said plane, and an operative connection between the swinging and sliding means for automatically insuring the movement of the sections in their proper sequence, said connection including lost-motion means for controlling the sequence of movement of the swinging and sliding sections.

4. A collapsible core comprising a plurality of core sections, a feed-screw, a nut traveller thereon, a worm fixed on the screw, means including said worm for partially collapsing the core by moving one of said sections relative to its position of operative continuity, and means including said traveller for further collapsing the core by moving another of the sections relative to its position of operative continuity, whereby on rotating said screw both sections are simultaneously moved relative to their positions of operative continuity.

5. A collapsible core comprising a plurality of core sections, means for moving one of said sections relative to the position of operative continuity of all the sections, means for moving another of the sections relative to said position, a common actuator for both means, lost-motion means for initiating movement of one of said sections after the initiation of movement of the other section is core-collapsing, and means for setting the lost-motion means to ineffectiveness in restoring the core to operative continuity thereby to initiate movements of both said sections toward such restoration simultaneously.

6. A collapsible core comprising a plurality of core sections, means for moving one of said sections relative to the position of operative continuity of all the sections, means for moving another of the sections relative to said position, a common actuator for both means, lost-motion means for initiating movement of the one of said sections after the initiation of movement of the other section in core-collapsing, and means for automatically setting the lost-motion means to ineffectiveness on operating said actuator for restoring the core sections to operative continuity.

7. A collapsible core comprising a plurality of core sections, means for moving one of said sections relative to the position of operative continuity of all the sections, means for moving another of the sections relative to said position, a common actuator for both means, lost-motion means for initiating the movement of one of said sections after the initiation of movement of the other section, and means for automatically predeterminedly functioning to operatively connect and disconnect one of the first-mentioned means relative to said actuator.

8. A collapsible core comprising a plurality of core sections, a feed-screw, a nut traveller thereon, a worm fixed on the screw, means including said worm for partially collapsing the core by moving one of said sections relative to its position of operative continuity, and means including said traveller for further collapsing the core by moving another of the sections relative to its position of operative continuity, whereby on rotating said screw both sections are simultaneously moved relative to their positions of operative continuity; the second-mentioned means further including a member movable axially of the feed-screw but having a shorter path of travel than the total path of travel of the nut axially of the feed-screw.

9. A collapsible core comprising a plurality of core sections, a feed-screw, a nut traveller thereon, a worm fixed on the screw, means including said worm for partially collapsing the core by moving one of said sections relative to its position of operative continuity, and means including said traveller for further collapsing the core by moving another of the sections relative to its position of operative continuity, whereby on rotating said screw both sections are simultaneously moved relative to their positions of operative continuity; the second-mentioned means further including a member movable axially of the feed-screw but having a shorter path of travel than the total path of travel of the nut axially of the feed-screw, and there being provided a latching means partially carried by said member and by the nut automatically predeterminedly actuated to insure that on a rotation of the feed-screw to restore the sections to operative continuity said member will be secured to the nut to be moved therewith.

10. A collapsible core comprising a plurality of core sections, a feed-screw, a nut traveller thereon, a worm fixed on the screw, means including said worm for partially collapsing the core by moving one of said sections relative to its position of operative continuity, and means including said traveller for further collapsing the core by moving another of the sections relative to its position of operative continuity, whereby on rotating said screw both sections are simultaneously moved relative to their positions of operative continuity; the second-mentioned means further including a member movable axially of the feed-screw but having a shorter path of travel than the total path of travel of the nut axially of the feed-screw and there being provided a latching means partially carried by said member and by the nut and automatically set to effectiveness and to ineffectiveness predeterminedly during a series of complete rotations of the screw to collapse the core and a series of reverse rotations of the screw to restore the sections to operative continuity.

11. A collapsible core comprising a plurality of core sections, and means for mounting two of the sections for simultaneous differential movements relative to the position of operative continuity of all the sections, said means including a member rotatable about an axis perpendicular to the plane of operative continuity and operatively connected to one of the sections and including a member movable perpendicularly to said plane and operatively connected to the other section.

12. A collapsible core comprising a plurality of core sections, and means for mounting two of the sections for simultaneous differential movements relative to the position of operative continuity of all the sections, said means including a rotatable member having a fixed field of rotation and operatively connected to one of the sections and including a member movable axially of the rotatable member and operatively connected to the other section.

13. A collapsible core comprising a plurality of core sections, and means for mounting two of the sections for simultaneous differential movements relative to the position of operative continuity of all the sections, said means including a rotatable member having a fixed field of rotation and operatively connected to one of the sections and including a member movable relative to the sections and operatively connected to the other sections, there being provided as a part of said means a common actuator for both sections and including a member movable along the axis of rotation of the rotatable member.

14. A collapsible core comprising a plurality of sections, one of said sections being slidable, a pivot for another section, a traveling register the distance of whose travel varies in accordance with the extent of the movement of one of said sections, means for simultaneously moving the slidable section and the register, and means actuated by the register for initiating the movement of the pivoted section about said pivot.

15. A collapsible core comprising a key section and a pivoted section, the key section being radially movable, a register whose setting varies in accordance with the extent of the radial movement of the key section, means for initiating the radial movement of said section and for varying the register setting, and means responsive to a certain setting of said register for initiating the pivotal movement of said pivoted section.

16. A collapsible core comprising a key section and a pivoted section, the key section being radially movable, a register whose setting varies from a minimum to a maximum in accordance with the extent of the radial movement of said key section, means for imparting the radial movement to said key section and for varying the register setting in one direction, and means responsive to a certain variation in said register setting for initiating the pivotal movement of the pivoted section the extent of the pivotal movement of the pivoted section being dependent upon the extent and direction of the variation of the setting of said register.

17. A collapsible core comprising a plurality of sections, one section movable into and out of the position of operative continuity and another section pivoted to swing into and out of the plane of operative continuity, means for initiating the movement of the first named section, and means dependent upon the extent of the movement thereof for initiating the swinging movement of the pivoted section.

18. In a collapsible core comprising swingable sections and slidable sections—movable in sequence, the combination with means for automatically moving all the sections of means for determining the sequence of their movement.

19. In a collapsible core comprising a plurality of sections including a pivoted section—said sections being relatively and sequentially movable, the combination with means for automatically moving all of said relatively movable sections of means for determining the sequence of their movement.

20. In a collapsible core comprising a plurality of movable sections at least one of said sections being pivoted for a swinging movement, the combination with means for automatically moving all the sections of means for determining the sequence of their movement.

21. In a collapsible core construction comprising a section radially slidable in the plane of normal operation and a section pivotally mounted to swing into and out of said plane, the combination with means for automatically sliding and swinging the said sections of means for determining the sequence of their movement.

22. In a collapsible core construction comprising a radially slidable section and a section pivotally mounted to swing into and out of the plane of normal operation, the combination with means for automatically sliding and swinging the said sections of means for determining the sequence of their movement.

23. A collapsible core comprising a plurality of sections operable in continuity in the plane of operative continuity of said core, one of said sections being radially movable in the plane of operative continuity, a pivot for another section whereon it may be swung into and out of the plane of operative continuity, an actuator, means operable responsive to the movement of said actuator to cause the radially movable section to move to and fro, and means operable responsive to the movement of said actuator to cause the pivoted section to swing about its pivot.

24. A collapsible core comprising a plurality of sections operable in continuity in the plane of operative continuity of said core, one of said sections being radially movable in the plane of operative continuity, a pivot for another section whereon it may be swung into and out of the plane of operative continuity, an actuator, means operable responsive to the movement of said actuator to cause the radially movable section to move to and fro, and means operable responsive to the movement of said actuator to cause the pivoted section to swing about its pivot and to automatically co-relate the movement of said pivoted section relative to that of the radially movable section.

25. A collapsible core comprising a plurality of sections operable in continuity in the plane of operative continuity of said core, one of said sections being radially movable in the plane of operative continuity, a pivot for another section whereon it may be swung into and out of the plane of operative continuity, an actuator operable to cause the movement of each of said sections, and automatic means controlled by the movement of said actuator to co-relate the movements of said sections.

26. A collapsible core comprising a slidable section, a pivoted section, a feed screw, a nut traveler thereon, means including said feed screw, for moving the slidable section radially in the plane of normal operation of the core, and means including said traveler, for swinging the pivoted section into and out of the plane of normal operation.

27. A collapsible core comprising a slidable section, a pivoted section, a feed screw, a nut traveler thereon, a worm operable in unison with the feed screw, means including said worm for moving the slidable section radially in the plane of normal operation of the core, and means including said traveler for swinging the pivoted section into and out of the plane of normal operation.

28. A collapsible core comprising in combination a pair of sections radially inwardly and then outwardly slidable during the collapsing movement of the core, and means for imparting the said movement to said sections in collapsing the core.

29. A collapsible core comprising in combination a section radially inwardly and then outwardly slidable during the collapsing movement of the core, another section also movable during the said collapsing movement, and means for imparting relative movement to said sections in sequence to collapse the core.

30. A collapsible core comprising in combination a section radially inwardly and then outwardly slidable within the plane of normal operation during the collapsing movement of the core, another section movable out of said plane during the said collapsing movement, and means for imparting relative movement to said sections in sequence to collapse the core.

31. A collapsible core comprising in combination a key section and a movable section; the key section being slidable radially inward to permit the subsequent movement of the movable section and slidable radially outward simultaneously with the movement of the movable section during the collapsing movement of the core; and means for first imparting the inward movement to the key section and for thereafter imparting movement to the movable section while at the same time imparting the outward movement to the key section.

BARTHOLD DE MATTIA.